United States Patent [19]

Roy et al.

[11] Patent Number: 5,505,978

[45] Date of Patent: Apr. 9, 1996

[54] BAKED CORN-BASED PRODUCT AND PROCESS

[75] Inventors: Pradip K. Roy, Grand Rapids; Gary S. Moore, Rockford, both of Mich.

[73] Assignee: APV Baker, Inc., Grand Rapids, Mich.

[21] Appl. No.: 243,406

[22] Filed: May 16, 1994

[51] Int. Cl.$^6$ .............................. A21D 6/00; A21D 17/00; A21D 10/00; A23D 1/164
[52] U.S. Cl. ........................ 426/549; 426/439; 426/560
[58] Field of Search .................................. 426/549, 560, 426/439

[56] References Cited

U.S. PATENT DOCUMENTS

| | | |
|---|---|---|
| 2,469,995 | 5/1949 | Schaul . |
| 3,027,258 | 3/1962 | Markakis et al. . |
| 3,297,450 | 4/1966 | Loska . |
| 3,384,495 | 5/1968 | Potter, Jr. et al. . |
| 3,493,390 | 2/1970 | Succo et al. . |
| 3,519,432 | 7/1970 | Succo et al. . |
| 3,589,914 | 6/1971 | Cooper et al. . |
| 3,698,914 | 10/1972 | Kortschot et al. . |
| 3,911,142 | 10/1975 | Huelskamp et al. . |
| 3,925,567 | 12/1975 | Abe . |
| 4,073,958 | 2/1978 | Abe . |
| 4,122,198 | 10/1978 | Wisdom et al. . |
| 4,197,793 | 5/1980 | Hanson et al. . |
| 4,418,088 | 11/1983 | Cantenot . |
| 4,455,321 | 6/1984 | Glabe et al. . |
| 4,528,202 | 7/1985 | Wang et al. . |
| 4,756,916 | 7/1988 | Dreher et al. . |
| 4,806,377 | 2/1989 | Ellis et al. . |
| 4,834,996 | 5/1989 | Fazzolare et al. . |
| 4,873,093 | 10/1989 | Fazzolare et al. . |
| 4,906,483 | 3/1990 | Kloos . |
| 4,950,492 | 8/1990 | Shachat et al. . |
| 4,978,548 | 12/1990 | Cope et al. . |
| 4,985,269 | 1/1991 | Irvin et al. . |
| 5,104,673 | 4/1992 | Fazzolare et al. . |
| 5,110,613 | 5/1992 | Brown et al. . |
| 5,171,600 | 12/1992 | Young et al. . |
| 5,188,859 | 2/1993 | Lodge et al. . |
| 5,194,277 | 3/1993 | Laufer . |
| 5,202,139 | 4/1993 | Gaon et al. . |
| 5,258,196 | 11/1993 | Lohan et al. . |
| 5,298,707 | 3/1994 | Sprecher et al. . |
| 5,320,858 | 6/1994 | Fazzolare et al. . |

FOREIGN PATENT DOCUMENTS 616321  1/1949  United Kingdom .

Primary Examiner—Carolyn Paden
Assistant Examiner—Choon P. Koh
Attorney, Agent, or Firm—Price, Heneveld, Cooper, DeWitt & Litton

[57] ABSTRACT

A method and apparatus for producing a baked starch-based corn product. The method involves mixing masa flour and water and incompletely cooking the mixture during a precooking step, preferably during mixing of the ingredients. The incompletely cooked masa is sheeted and cut into shapes. The shapes are steamed, baked, and then dried. The steaming and baking steps advance the cooking of the masa constituents incompletely cooked during the mixing stage, resulting in an improved texture, bite, and shipping characteristic.

24 Claims, 4 Drawing Sheets

BAKED CORN-BASED PRODUCT AND PROCESS

FIELD OF THE INVENTION

The instant invention relates to a product and a method for making non-fried starch-based food products, and particularly to a product and process for preparing a baked food product, in particular of chip-like form, from masa flour.

BACKGROUND OF THE INVENTION

In the past, many corn-based products were prepared using continuous deep-fat frying techniques. However, products cooked using oil contained cholesterol or fat and are generally deemed to be less wholesome than those without such by-products. To remove such undesirable contents, the industry attempted to produce the same type of product without using oils for cooking by baking the product. However, by changing the cooking processes, the taste of the product also changed.

Many factors play a role in the way a product tastes. These factors include ingredients, moisture content, and cooking time. The same factors also affect the texture of the product such as crispness, crunch, or bite, and the like. No matter whether the product was cooked by deep-fat frying or by baking, the industry has always thoroughly mixed the ingredients to produce a homogenous dough. To produce the dough, the ingredients were mixed sufficiently prior to sheeting so that the resulting dough was readily workable and would form an even sheet.

Fully gelatinizing the dough by thoroughly mixing and cooking the ingredients produces a glassy sheet of dough having a high moisture content, which requires longer baking and drying periods to drive off the moisture. Typically, such results produce a product which is brittle and has a less-desirable texture and taste.

SUMMARY OF THE INVENTION

The instant invention produces a non-fried, starch-based food product, such as a masa corn chip, by imperfectly gelatinizing the corn ingredient prior to baking and drying, resulting in a baked corn chip which more closely resembles oil-fried corn chips in taste and texture but without the undesirable fat content.

In one embodiment of the process, a corn mixture is prepared from whole corn, cooked and soaked in water with calcium hydroxide, or from masa flour and water. The mixture produces a masa dough having a moisture content of approximately 45 percent. The dough is formed into a sheet and cut into the desired chip shape prior to toasting. Following toasting, the shapes are passed through a proofer before being steamed to partially cook the particles. The chips are then baked and dried to produce the finished product.

In another embodiment, masa flour and water are mixed and steamed in a continuous mixer-cooker. The masa flour/water mixture ingredients could be added at different intervals to produce a poorly mixed, partially cooked masa agglomerate which is spread in a sheet before cutting into the desired shapes. The partially cooked shapes are toasted and equilibrated before being baked and dried to produce the finished product.

In yet another embodiment, masa flour, water, and steam are mixed in a continuous mixer-cooker where the poorly mixed masa agglomerate is heated to above 150° F. Various parts of the agglomerate may remain in the mixer-cooker between 20 seconds and 3 minutes. As a result, portions of the agglomerate are cooked or gelatinized more fully than others before being formed in a sheet and cut into the desired shapes. Following cutting, the shapes are conditioned using steam to advance the cooking or gelatinization of the particles incompletely cooked during the mixing step. The steamed shapes are then baked and dried to produce the finished product.

Fully gelatinizing the dough by thoroughly mixing and cooking the ingredients produces a glassy sheet of dough having a high moisture content, which requires longer baking and drying periods to drive off the moisture. Typically, such results produce a product which is brittle and has a less-desirable texture and taste.

The problems of fully gelatinizing a corn dough associated with the methods prior to this invention are avoided. The sheeted product does not have a glassy texture, which produces a brittle chip, hard bite, and overall less-desirable taste.

The advantages provided by this method include maintaining a balanced moisture content in the masa agglomerate mixture throughout the cooking process to sufficiently gelatinize the agglomerate without producing a glassy, brittle chip. Incomplete cooking of the agglomerate produces a better texture for the chip than previous methods where gelatinization was complete during the mixing step. The end result is a product low in fat and cholesterol, and which has a palatable texture and taste much like deep-fat fried corn chips.

BRIEF DESCRIPTION OF THE DRAWING FIGURES

A better understanding of the invention and the advantages provided thereby may be obtained by reference to the specification and the attached drawing figures, wherein.

DEFINITIONS

"Masa" as used herein shall mean either whole corn soaked or steeped for at least six hours in a solution of water and calcium hydroxide or corn flour dried from the steeped ground whole corn. The masa can have a range of grain sizes from coarse to fine grind. "Masa agglomerate" or "coin agglomerate" shall mean a mixture of the steeped ground corn and/or corn flour and water which has been incompletely mixed to produce a lumpy or globular mixture and not the homogenous consistency of a dough as would be the literal translation of the word "masa."

DETAILED DESCRIPTION OF THE VARIOUS EMBODIMENTS

For years, corn-based snack food products were cooked by deep-fat frying a corn dough to produce a crispy corn product. However, with the trend of removing oil from the product, frying is no longer the desired cooking technique. The instant invention provides a process for making corn-based food products without flying and is particularly suited for corn masa, flour-based food products such as corn tortilla chips.

Figure 1:
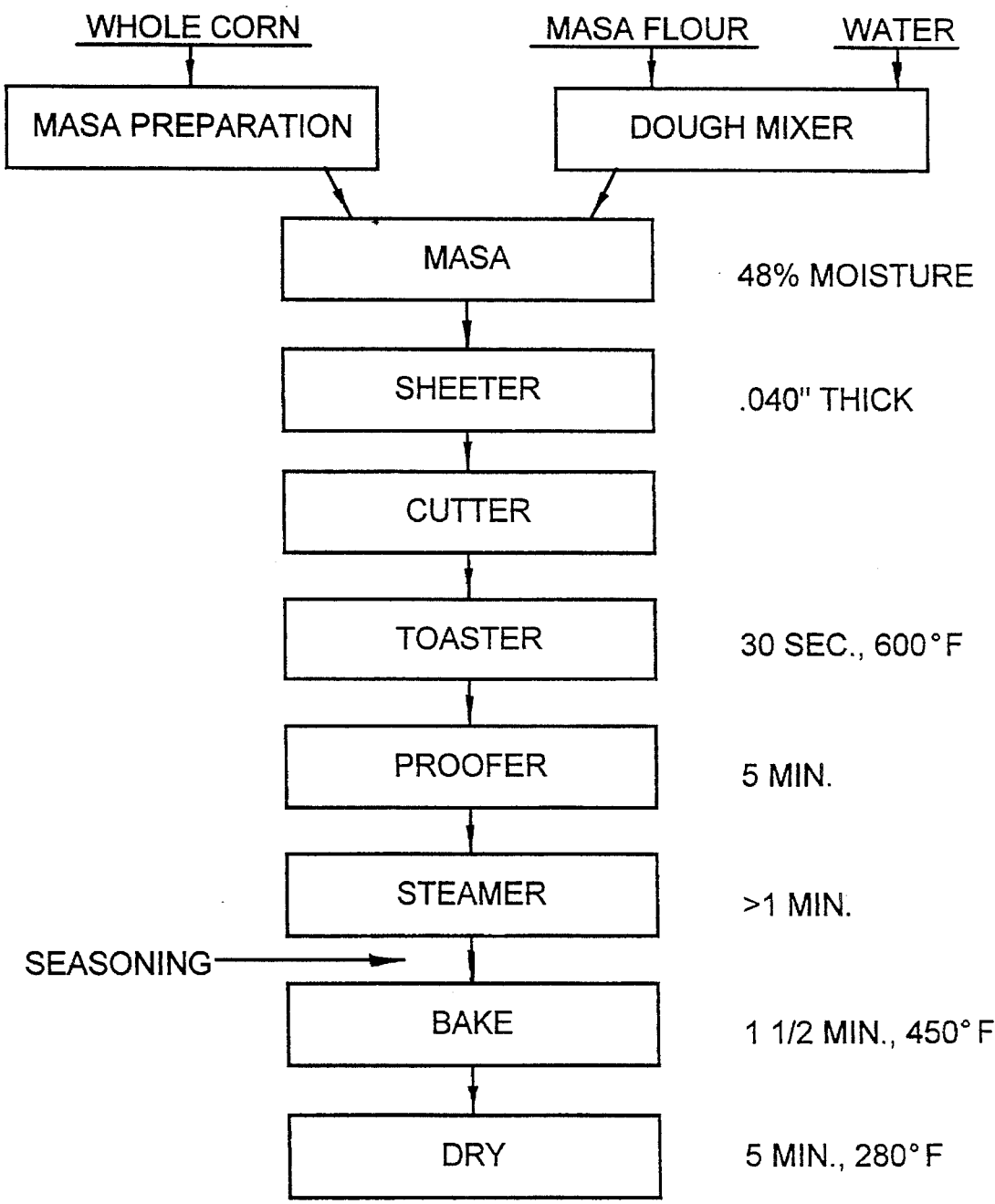
FIG. 1 is a flow diagram of one embodiment of a process embodying features of the invention.

Referring to FIG. 1, masa dough is prepared by mixing masa flour and water and/or from whole corn soaked in a calcium hydroxide solution. If a blend is selected, it is preferred that the blend include 50 to 75 percent masa ground from the steeped corn and 25 to 50 percent masa flour. Although such a blend is shown only with respect to the embodiment shown in FIG. 1, such blends may be used in any of the embodiments described herein or modifications of such embodiments. The mixture preferably contains between 40 and 50 percent moisture, preferably close to 40 percent in the masa/masa flour blends, and 45 to 48 percent water when using one or other of the masa or masa flour. The mixing process may be carried out using a number of mixers or blenders including continuous mixers and atmospheric batch blenders such as available from Peerless Machinery Corp. of Sydney, Ohio; APV Baker, Inc. of Grand Rapids, Mich.; or Tweedy APV PLC of England. Following mixing, the masa dough is sheeted and cut to the desired shapes. Triangular shapes are preferred to reduce waste. It is also preferred that the thickness of the sheet of masa dough range between 0.030 and 0.045 of an inch, and most preferably approximately 0.038 inch.

Following cutting, the shapes are toasted, preferably in a gas-fired oven at a temperature greater than 500° F. for at least 15 seconds, and most preferably at 600° F. for 20 seconds. The toasting step forms a skin on each side or surface of the corn shape. At this point, it has been found that the moisture content in the masa dough has dropped from approximately 45 to 48 percent to around 20 to 30 percent. To prevent puffing of the chip, resulting from the migration of moisture from the inside of the chip outwardly, the shapes or chips are passed through a proofer to equilibrate or balance the moisture in the chip. It is preferred that proofing or balancing take between 4 to 6 minutes, and most preferably 5 minutes.

From the proofer, it is preferred that the chips pass through a steam tunnel or the like where steam encompasses the chips. The steam adds additional heat and moisture to the chips and is believed to hydrate and partially gelatinize corn masa granules which were only partially cooked during the mixing and toasting steps. The steam may be introduced at a pressure of greater than 1 lb. and at a temperature of 212° F. or greater. The steam directed onto the chips is simply allowed to fill the steam tunnel.

Once the chip products have been steamed, the product may be seasoned. The steam moistens the chip exterior, allowing the seasoning to adhere to the chip. Alternatively, the chip may be seasoned prior to steaming.

After the chips have been steamed, and after the optional seasoning step, the chips are baked, dried, and then packaged. Depending upon the type of oven used in the baking step, the time and temperatures will vary. If a high convection air oven is used, the oven may be used at a temperature between 400° F. and 500° .F, where the chips are baked between 1 and 2 minutes. It is preferred that a temperature of 450° F. be used to bake the chips for 1.5 minutes. Other ovens include impingement and fluidized bed ovens. If a blistered chip texture is desired, the more efficient ovens, such as convection and impingement ovens, are preferred. The skin formed on the chip by toasting may be increased by increasing the heat transfer during the toasting step. The skin traps moisture in the interior of the chip. Passing of the skinned chip through the more efficient convection or impingement oven causes the moisture in the chip interior to migrate outwardly to produce the bubble or blister.

In this embodiment, the ovens used to bake the chips are also used to dry them. It is preferred that drying occur between 4 and 7 minutes at a temperature ranging between 250° F. and 300° F. Drying of the chips at a temperature of 280° F. for 5 minutes is most preferred. In order to maximize the drying step, the chips should pass through the dryer portion of the ovens as a single layer. If chips are on top of each other, it takes longer to dry since the air cannot freely circulate about the entire chip.

Figure 2:
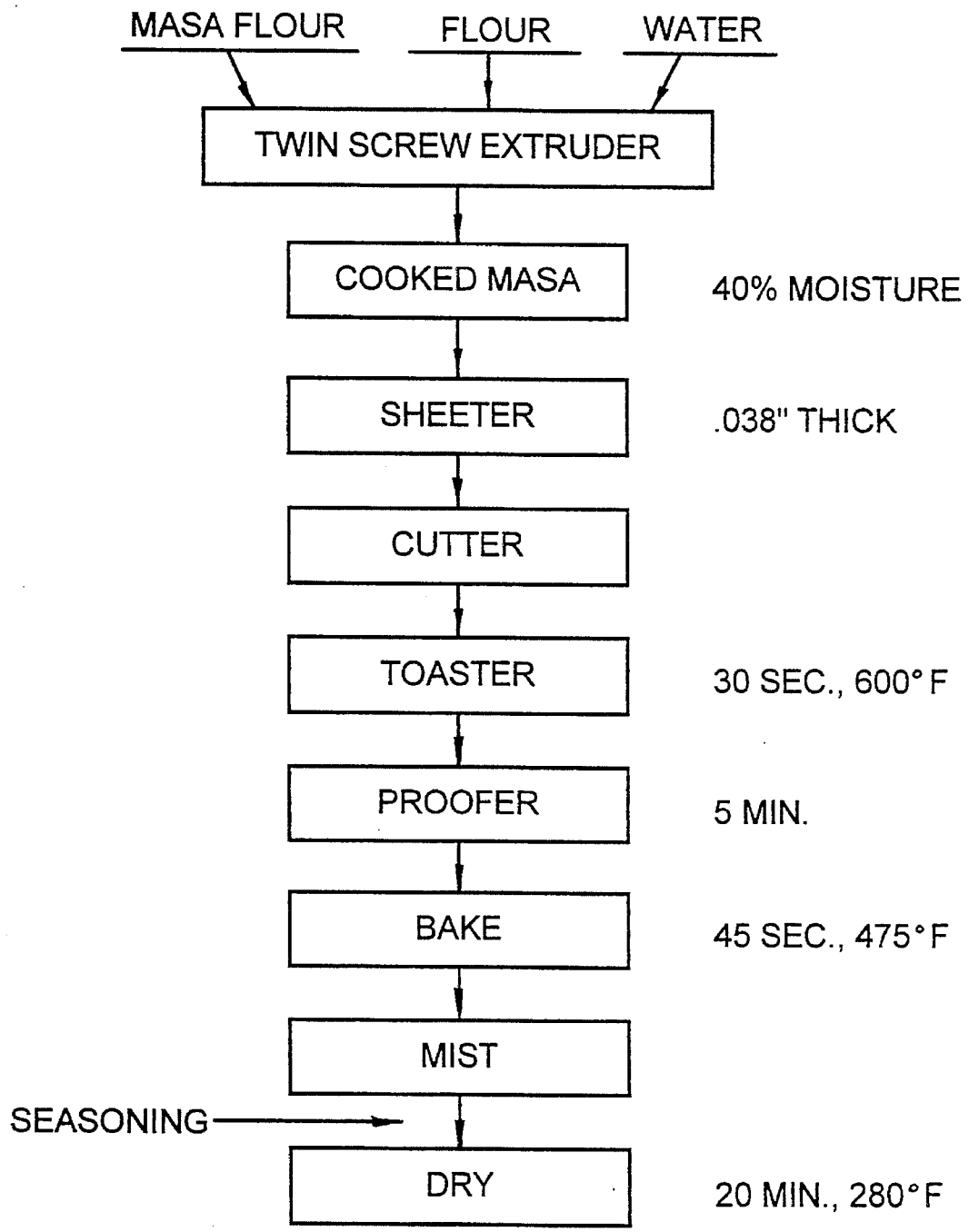
FIG. 2 is a flow diagram of another embodiment of a process embodying elements of the invention.

The above process was found to produce a corn chip/tortilla improved over previous baking processes. The reason for the improvement is believed to be in the additional cooking/steaming step. But because the conveyor carrying the chip runs at a rate between 50 and 100 feet per minute, a long steam tunnel would be needed to fully carry out this method. To reduce the steaming process of FIG. 1, the additional cooking step would change to the beginning of the method as shown in FIG. 2. In this manner, the time required for the additional cooking step is shortened when combined with the mixing step and is implemented again in a different way in the embodiment of FIG. 2.

In the embodiment shown in FIG. 2, masa flour and water are mixed in a continuous mixer such as a twin screw mixer available from APV Baker, Inc. of Grand Rapids, Mich. Such units are extremely efficient in mixing and cooking the ingredients therein. If fully cooked, the dough can be spread in a well-gelatinized sheet which is glassy or transparent in appearance. If cut, baked, and dried, the resulting product is brittle and homogeneous—features undesirable in corn tortilla chips. In order to overcome the efficiency of the mixer, additional masa flour is added at different times and locations along the mixer such that a portion of the masa is fully gelatinized, while other portions are partially gelatinized, and others are not gelatinized at all. This incomplete cooking and mixing produces a masa agglomerate, that when sheeted, is not uniform in appearance or texture and may be characterized as rough.

The rough sheet of masa agglomerate is preferably 35 to 45 percent water and has a thickness on file order of 0.035 and 0.045 of an inch, and most preferably has 40 percent water content with a thickness of 0.038 inch before cutting of the shapes occurs. The cut shapes are then toasted, preferably in a gas-fired oven at 500° F. or greater for at least 15 seconds, and most preferably at 600° F. for 20 seconds. Once toasted sufficiently to form the skin on the chips and reduce the moisture content to between 20 and 30 percent, the chips are equilibrated in the proofer portion of the process for at least 4 minutes, and most preferably around 5 minutes. Once equilibrated so as to avoid subseqnent puffing of the chips, the chips are again steamed in order to advance the gelatinization of the uncooked ingredients. The chips may optionally be seasoned, following the steaming, and baked, dried, and packaged. In this embodiment, with an impingement oven, baking time is reduced to between 40 and 50 seconds, but at a greater temperature ranging between 450° F. and 500 ° F. Most preferably, the temperature is 475° F. while baking time is 45 seconds. Drying can take place for between 4 and 7 minutes at a temperature between 250° F. and 300° F. Again, the preferred temperature and time is 280° F. for 5 minutes. Optionally in this embodiment, the chips may be misted following the baking process and seasoned before drying to adhere the seasoning to the chip.

Figure 3:
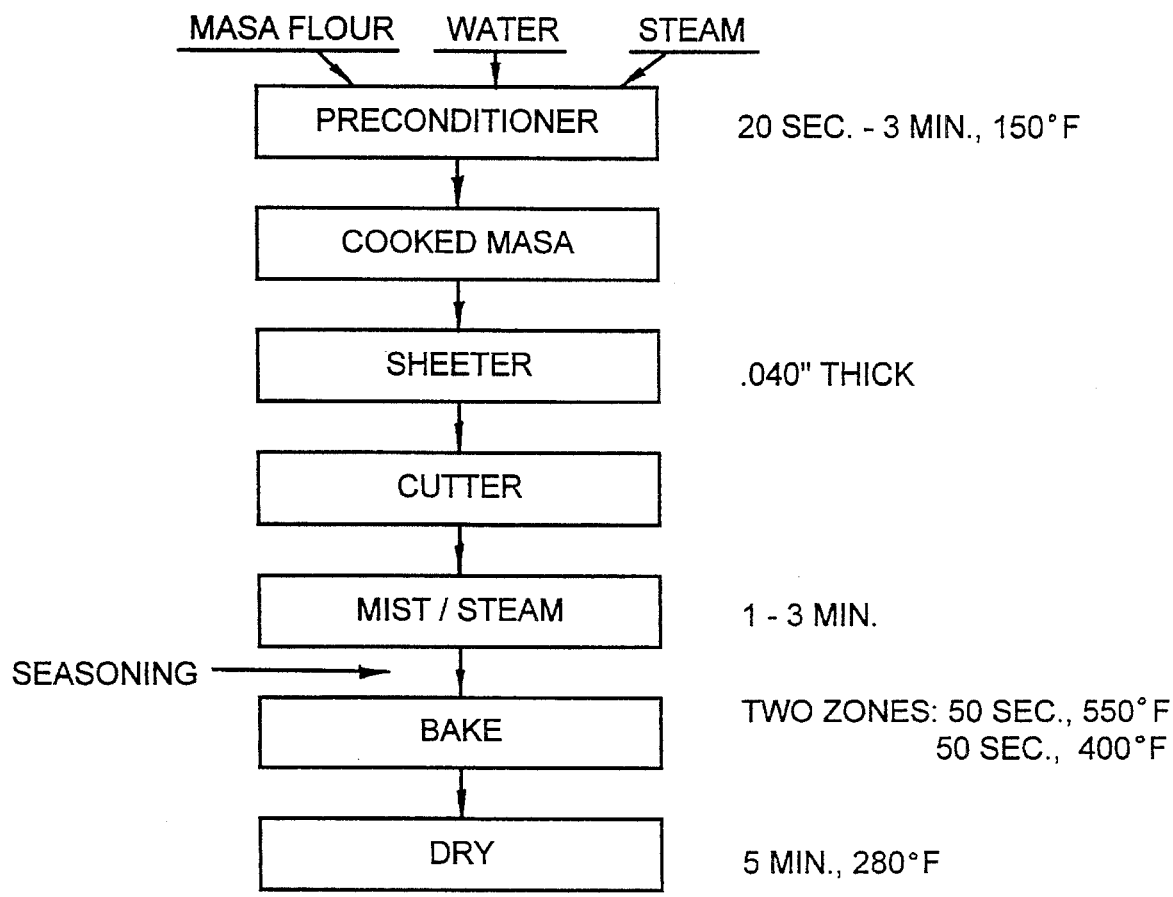
FIG. 3 is a flow diagram of a preferred embodiment of the invention.

To eliminate the step of adding more masa flour to the twin screw mixer to vary the cooking of the ingredients, the preferred approach (FIG. 3) is to split the cooking of the masa agglomerate by first mixing and cooking the ingredients in a less-efficient mixer and later steaming or misting the agglomerate. Such a system includes a preconditioner or liquid/solid blender available from ExtruTech of Sabetha, Kans. Using such a device, the masa flour and water are first mixed into an agglomerate and steamed at a temperature ranging between 150° F. and 210° F., most preferably 180° F., for between 20 seconds and 3 minutes. As a result of the operation of the preconditioner/blender, some ingredients remain in the mixer for a longer period than others, becoming better cooked or gelatinized. Steam and water are introduced for hydration and cooking. The masa agglomerate produced by the preconditioner is discharged onto a conveyor at a temperature of approximately 180° F. The agglomerate is allowed to cool to approximately 140° F. before sheeting and cutting. As in the prior embodiments the appearance and texture of the masa agglomerate sheet (approximately 0.040 inch thick) is rough, with certain areas exhibiting the glassy texture produced by gelatinization.

Once the masa agglomerate has been sheeted and cut into shapes (preferably triangular to avoid waste), the shapes are optionally, and preferably, passed along a conveyor through a product conditioning tunnel which surrounds them in steam for between 1 and 3 minutes. Optionally, seasoning of file product may transpire either before or after steaming, depending upon the desired end product. The seasoned or unseasoned shapes are then baked in a recirculating air oven for at least 1.5 migrates at a temperature of at least 400° F., preferably in a two-zone oven wherein the chips are first baked for at least 45 seconds at 500° F. and for at least 45 seconds in a second zone having a temperature of 400° F. The product is then dried for at least 4 to 7 minutes at 250° F. to 300° F., and desirably for 5 minutes at 280° F.

As briefly mentioned above, a mixture of masa flour and steeped masa may constitute the starting ingredients of the product. The preferred blend of ingredients ranges between 25 and 50 percent masa flour and 50 and 75 steeped masa. Depending upon the flavor note to be achieved, the two ingredients are mixed in the preconditioner described above to produce an agglomeration having a 40 percent moisture content. As in the previous embodiment, steam is introduced during the mixing process. In the alternative, an atmospheric batch mixer may be used with steam manually added during the mixing by the baker. Using either technique, the resulting agglomerate is processed in generally the same manner as described above.

Figure 4A:
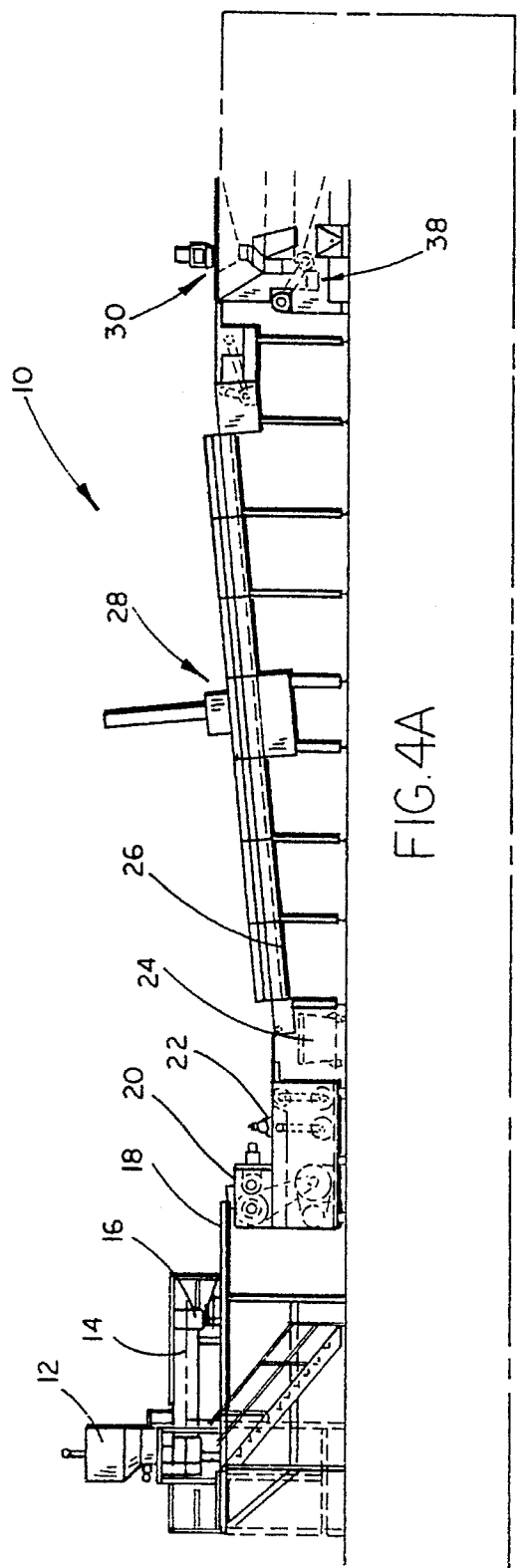
FIGS. 4A and 4B illustrate one embodiment of a system for carrying out the methods.
Figure 4B:
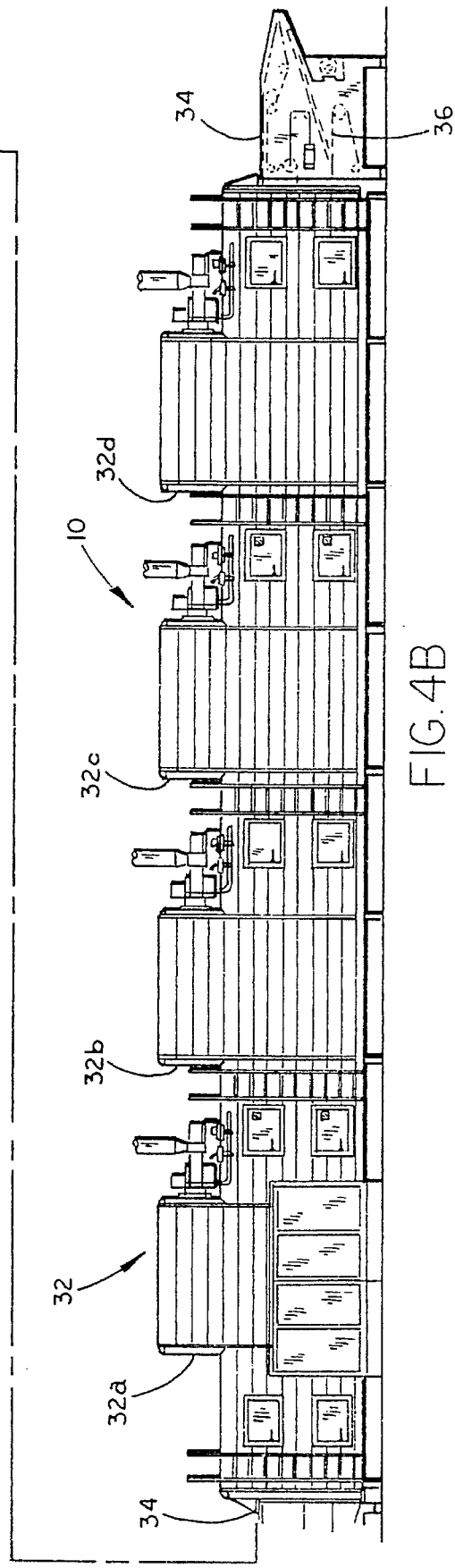

Referring to FIGS. 4A and 4B, one embodiment of system 10 is shown for implementing the method of this invention. The ingredients are introduced by an ingredient feeder 12 into a continuous mixer 14, such as the preconditioner or liquid/solid blender described above. Water, steam, steeped masa and/or masa flour are mixed and partially cooked in continuous mixer 14 to produce a masa agglomerate having a moisture content of 35 to 45 percent. The partially cooked agglomerate is raised to a temperature approximating 180° F. when output at the end of mixer 14 through a spreader 16 onto a feed conveyor 18. At this point, the moisture content of the agglomerate may range between 30 and 45 percent. Conveyor 18 transfers the spread agglomerate to a heavy duty, two-roll chip sheeter 20 where it is formed into a sheet having a thickness of approximately 0.040 inch. The sheet is then fed through a chip-sheeting base with a rotary cutter 22. It is preferred that the sheet be cut into triangular shapes so that waste is minimized. However, other shapes, such as circular, may be cut and the waste or scrap is ground and reintroduced into mixer 14. Trough 24 is used to capture the scrap material.

Following sheeting and cutting, the shaped agglomerate is the onto a conveyor 26 which optionally, but preferably passes the product through a conditioning tunnel 28 where steam enshrouds the product for 30 seconds to 3 minutes. At this point, the product may be seasoned, either prior to or subsequent the conditioning runnel 28. In the embodiment shown, seasoning occurs in a salter 30 located at an entrance to a series of ovens 32 (FIG. 4B). It is preferred that four heat recirculating or convection ovens 32a, 32b, 32c, and 32d be placed end-to-end, each having an upper baking conveyor 34 and a lower drying conveyor 36. The cut product is passed from the seasoner/salter 30 to conveyer 34 of oven 32a. The baking conveyors of each oven are interconnected so that the baking process occurs first. The baked chip is passed from conveyer 34 of oven 32d down to conveyer 36 of oven 32d. Conveyor 36 moves in an opposite direction to dry the chips and passes from oven 32d through ovens 32c, 32b, and finally out of oven 32a into a dryer discharge 38 where the product is collected and moved on to packaging. As briefly mentioned above, the series of ovens provide different baking zones. In this embodiment, ovens 32a, 32b provide a first baking zone at a temperature of 500° F., while ovens 32c, 32d operate at a baking temperature of 400° F. The temperature along the drying conveyor 36 through all four ovens is generally constant at 280° F.

Referring back to the continuous mixer 14, and in accordance with the preferred method of this invention, steam is introduced into the mixer along with the masa and water. It has been found that steam injected through a fitting 40 located in the bottom of the continuous mixer 14 produces the best results, although fittings such as 40 extending into the mixer 14 may also be effective. It is believed that steam entering from the bottom of the mixer condenses quicker than if introduced through the top or sides because the steam contacts the masa and is mixed in the masa faster. The condensing and rapid mixing of the steam aids in the partial cooking of the masa agglomerate. In contrast, steam injected frown the top or sides of the mixer is suspended in the space above the masa agglomerate and does not become rapidly mixed into the agglomerate.

The above production system when used in association with the methods described above produces a baked, starch-based product made from masa which has desirable mouthfeel and low fat content. The chip strength is suitable for condiment dips and has a better bite and chewing consistency than prior such baked products. This is achieved without deep-fat flying or by fully cooking the masa flour to completely gelatinize the cornstarch in the masa. The chip strength can be controlled to survive transportation better than other baked corn products. Because the masa was not fully cooked, the dough never becomes completely gelatinized to produce the glassy texture. The end result is a better-tasting, healthier corn-based food product.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A method for making a non-fried, corn-based food product, comprising the steps of:

mixing masa flour and water to produce an agglomerate;

partially gelatinizing said agglomerate;

spreading the partially gelatinized agglomerate into a sheet;

cutting the sheet into shapes; and baking the shapes for at least 30 seconds at a temperature greater than 375° F., 2. The method as defined in claim 1, further including wasting the shapes at a temperature greater than 400° F. for at least 15 seconds.

3. The method as defined in claim 1, further including the step of drying the baked shapes for more than 4 minutes at a temperature greater than 180° F.

4. The method as defined in claim 1, further including heating said agglomerate in a mixture to a temperature between 150° F. and 200° F.

5. The method as defined in claim 1, wherein the step of spreading said partially gelatinized agglomerate into a sheet further includes producing a rough-textured sheet from, said partially gelatinized agglomerate, said sheet having a localized, glassy texture.

6. The method as defined in claim 6, further including steaming said partially gelatinized agglomerate prior to the step of baking, 7. A method for producing a baked corn chip product, comprising the steps of: blending a mixture of constituents, including at least one of masa flour and water to produce an agglomerate having a moisture content generally between 30 and 60 percent by weight;

partially gelatinizing said agglomerate at a temperature at least equal to 120° F.;

spreading the partially gelatinized agglomerate in a sheet of predetermined thickness and cutting the sheet into shapes; and baking the shapes to produce a corn chip product having a moisture content of less than 10 percent by weight.

8. The method as defined in claim 7, further including steaming the cut shapes to more fully gelatinize said agglomerate comprising the shapes.

9. The method as defined in claim 7, further including drying the shapes after baking.

10. The method as defined in claim 7, wherein the step of blending includes mixing said constituents in a pro conditioner such that some of said constituents reside in said preconditioner longer than other constituents.

11. The method as defined in claim 7, further including misting said agglomerate prior to the step of baking.

12. The method as defined in claim 7, wherein the step of baking includes passing the shapes through first and second baking zones, wherein the first zone has a temperature greater than 500° F. and the second zone has a temperature greater than 350° F.

13. The method as defined in claim 12, further including passing the shapes through a third zone having a temperature greater than 250° F.

14. The method as defined in claim 7, wherein the step of spreading includes forming a rough-textured sheet having a localized glassy texture.

15. The method as defined in claim 8, further including seasoning said agglomerate before or after the step of steaming.

16. The method as defined in claim 7, wherein the step of blending includes producing a partially gelatinized agglomerate having a moisture content between 40 and 50 percent by weight.

17. The method as defined in claim 7, wherein the step of spreading includes discharging the partially gelatinized agglomerate from the spreader at a moisture content of approximately between 30 and 45 percent.

18. A method for making a non-fried, starch-based food, comprising the steps of:

mixing at least one corn-based constituent with water to produce an agglomerate having a moisture content between 30 and 60 percent by weight;

spreading said agglomerate into a predetermined shape;

partially gelatinizing said corn-based constituent in said agglomerate; and baking said agglomerate to fully gelatinize said corn-based constituent in said agglomerate.

19. The method as defined in claim 18, further including cutting said agglomerate into shapes.

20. The method as defined in claim 18, further including toasting said agglomerate at a temperature greater than 400° F. for at least 15 seconds.

21. The method as recited in claim 18, further comprising steaming said agglomerate prior to the step of baking.

22. The method as recited in claim 18, further comprising drying said agglomerate following the step of baking.

23. A method for making a non-fried, starch-based food, comprising the steps of:

producing a partially gelatinized agglomerate including a portion of masa flour and water;

forming said partially gelatinized agglomerate into a sheet; and baking said sheet for at least 30 seconds at a temperature greater than 375° F.

24. A method for making a non-fried, corn-based product, comprising the steps of:

combining a mixture of constituents including at least masa flour and water and producing a partially gelatinized agglomerate therefrom;

spreading said partially gelatinized agglomerate into a sheet; and baking said sheet to more fully gelatinize said agglomerate forming said sheet.

* * * * *

UNITED STATES PATENT AND TRADEMARK OFFICE
CERTIFICATE OF CORRECTION

PATENT NO. : 5,505,978

DATED : April 9, 1996

INVENTOR(S) : Pradip K. Roy and Gary S. Moore

It is certified that error appears in the above-indentified patent and that said Letters Patent is hereby corrected as shown below:

Column 2, line 54
"coin" should be --corn--.

Column 3, line 1
"flying" should be --frying--.

Column 5, line 28
"migrates" should be --minutes--.

Column 6, line 2
"the" should be --fed--.

Column 6, line 47
"flying" should be --frying--.

Column 7, line 7
"wasting" should be --toasting--.

UNITED STATES PATENT AND TRADEMARK OFFICE
CERTIFICATE OF CORRECTION

PATENT NO. : 5,505,978

DATED : April 9, 1996

INVENTOR(S) : Pradip K. Roy and Gary S. Moore

It is certified that error appears in the above-indentified patent and that said Letters Patent is hereby corrected as shown below:

Column 7, line 42 and 43
"pro conditioner" should be --pre-conditioner--.

Signed and Sealed this

Ninth Day of July, 1996

Attest:

BRUCE LEHMAN

Attesting Officer        Commissioner of Patents and Trademarks